(12) United States Patent
Kwon et al.

(10) Patent No.: US 7,515,941 B2
(45) Date of Patent: Apr. 7, 2009

(54) METHOD FOR PERFORMING FUNCTIONS USING TELEPHONE NUMBER SEARCHED FOR IN MOBILE TERMINAL

(75) Inventors: Hae-Moon Kwon, Suwon-si (KR); Jeong-Gyu Jin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 345 days.

(21) Appl. No.: 11/133,542

(22) Filed: May 20, 2005

(65) Prior Publication Data

US 2005/0266838 A1 Dec. 1, 2005

(30) Foreign Application Priority Data

Jun. 1, 2004 (KR) ..................... 10-2004-0039847

(51) Int. Cl.
*H04B 1/38* (2006.01)
*H04M 1/00* (2006.01)

(52) U.S. Cl. .................. 455/564; 455/406; 455/411; 455/435.1; 455/410; 379/201.01; 379/220.01; 379/357.02

(58) Field of Classification Search .......... 455/564, 455/406, 411, 410, 566, 435.1, 415, 413
See application file for complete search history.

(56) References Cited

U.S. PATENT DOCUMENTS

| | | | | |
|---|---|---|---|---|
| 5,349,629 A * | 9/1994 | Kumano | ..................... | 455/564 |
| 5,568,546 A * | 10/1996 | Marutiak | ................ | 379/355.05 |
| 5,708,804 A * | 1/1998 | Goodwin et al. | ................ | 707/3 |
| 5,991,396 A * | 11/1999 | Salm et al. | ............. | 379/355.09 |
| 6,351,655 B1 * | 2/2002 | Tsuji et al. | .................. | 455/564 |
| 6,374,121 B1 * | 4/2002 | Mugura et al. | ........... | 455/550.1 |
| 6,408,188 B1 * | 6/2002 | Park | ........................... | 455/466 |
| 6,430,405 B1 * | 8/2002 | Jambhekar et al. | .......... | 455/403 |
| 6,449,496 B1 * | 9/2002 | Beith et al. | .................. | 455/563 |
| 6,608,895 B1 * | 8/2003 | Avidan | .................. | 379/355.01 |
| 6,658,284 B1 * | 12/2003 | Rosen et al. | ................. | 600/511 |
| 6,704,398 B2 * | 3/2004 | Tsuchiyama | ............. | 379/93.23 |
| 6,768,991 B2 * | 7/2004 | Hearnden | ...................... | 707/5 |
| 6,775,560 B2 * | 8/2004 | King et al. | .................. | 455/566 |
| 6,895,559 B2 * | 5/2005 | Forder | ........................ | 715/780 |

(Continued)

FOREIGN PATENT DOCUMENTS

CN 1330501 1/2002

(Continued)

*Primary Examiner*—Marceau Milord
(74) *Attorney, Agent, or Firm*—The Farrell Law Firm, PC

(57) ABSTRACT

Disclosed is method for searching for a telephone number and performing a function using the detected telephone number on a mobile terminal, which includes checking whether an input by a user in a standby mode is a number of consecutive digits, searching a telephone number database (DB) in the mobile terminal to detect and display telephone numbers having the inputted number of consecutive digits, searching the telephone number DB when the input by the user is a character or characters to detect and display telephone numbers of people having names corresponding to the inputted character or characters, displaying a menu of functions available using any of the displayed telephone numbers. The user can input a keyword for a telephone number in an idle state of the mobile terminal; without the need to select a separate menu for telephone number search.

10 Claims, 10 Drawing Sheets

U.S. PATENT DOCUMENTS

| | | | |
|---|---|---|---|
| 6,957,060 B1 * | 10/2005 | Sharp | 455/410 |
| 7,003,327 B1 * | 2/2006 | Payne et al. | 455/566 |
| 7,046,993 B2 * | 5/2006 | Haaramo et al. | 455/414.4 |
| 7,072,461 B2 * | 7/2006 | Padawer et al. | 379/355.09 |
| 7,085,369 B2 * | 8/2006 | Wang | 379/355.02 |
| 7,096,009 B2 * | 8/2006 | Mousseau et al. | 455/415 |
| 7,203,502 B2 * | 4/2007 | Wilson et al. | 455/456.2 |
| 7,231,229 B1 * | 6/2007 | Hawkins et al. | 455/564 |
| 7,266,186 B1 * | 9/2007 | Henderson | 379/142.04 |
| 7,295,836 B2 * | 11/2007 | Yach et al. | 455/415 |
| 7,305,076 B1 * | 12/2007 | Henderson | 379/142.04 |
| 7,372,826 B2 * | 5/2008 | Dahod et al. | 370/328 |
| 2004/0052355 A1 | 3/2004 | Awada et al. | |

FOREIGN PATENT DOCUMENTS

| | | |
|---|---|---|
| CN | 1450777 | 10/2003 |
| EP | 0 951 163 | 10/1999 |
| EP | 1 259 050 | 11/2002 |
| EP | 1 259 051 | 11/2002 |
| WO | WO 01/31509 | 5/2001 |

* cited by examiner

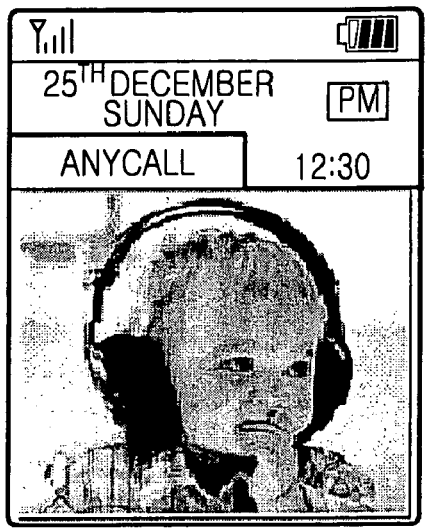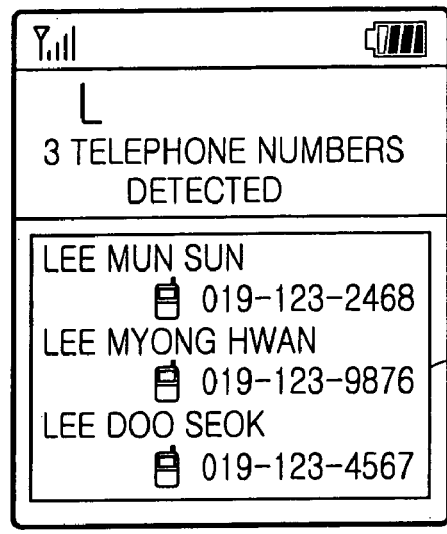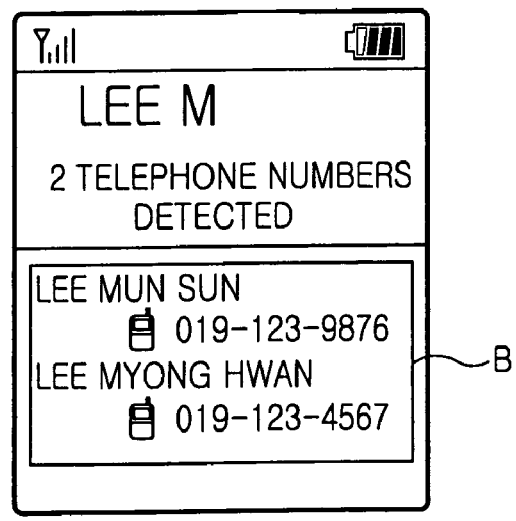
FIG.6A  FIG.6B
FIG.6C

METHOD FOR PERFORMING FUNCTIONS USING TELEPHONE NUMBER SEARCHED FOR IN MOBILE TERMINAL

PRIORITY

This application claims priority to an application entitled "Method for Performing Functions Using Telephone Number Searched for in Mobile Terminal" filed with the Korean Intellectual Property Office on Jun. 1, 2004 and assigned Serial No. 2004-39847, the contents of which are incorporated herein by reference.

BACKGROUND OF THE INVENTION

1. Field of the Invention

The present invention relates to a mobile terminal, and more particularly to a mobile terminal and method for searching for a telephone number and performing a function using the detected telephone number.

2. Description of the Related Art

Generally, mobile terminals can store a plurality of telephone numbers and have a function to search for and display a stored telephone number according to a keyword inputted by a user.

A common method for searching for a telephone number stored in a mobile terminal is to select a menu for a telephone number search, input a keyword for the telephone number that the user wishes to find and then to press a search key. The mobile terminal then displays one or more telephone numbers which meet the search criterion of the inputted keyword. For example, after selecting the menu for telephone number search, the user may input the last four digits of a telephone number to be detected and presses the search key. Then the mobile terminal then searches for a telephone number or numbers having the same last four digits as those which were entered by the user and displays the detected telephone numbers so that the user can select the desired telephone number. Likewise, a user can perform a telephone number search using a keyword such as a name of a desired entity (e.g., a person, business, etc.) by inputting characters contained in the name of the entity and then perform the search for detecting the desired telephone number. When the user inputs an initial character of the name and presses the search key, the mobile terminal searches for and displays names having the same initial character and the corresponding telephone numbers.

However, these and other conventional methods require the multiple steps of selecting a menu for a telephone number search, inputting a keyword of an entity whose telephone number is desired to be detected and then pressing the search key to perform the search. Since many mobile terminals produced by different manufacturers have individualized and mobile terminal specific menus and/or keys, users often times must learn, or become accustomed to a specific mobile terminal's keys before being able perform a search for a telephone number or numbers, which can inconvenience the user.

Many users search for a certain telephone number or numbers on their mobile terminals because they do not or cannot remember the desired number or numbers. In most cases, users search for a telephone number in order to implement a function using the telephone number, e.g. the user may wish to use the number to make a phone call, to send a text message or to edit the telephone number. Conventional mobile terminals can merely search for and display a telephone number, without displaying functions directly available using the detected telephone number.

Before selecting a menu for performing a desired function, the user has to memorize for later use the telephone number detected in the telephone number search mode and terminate the search mode. It is troublesome and inconvenient for the user to select the search mode and then the menu for available functions.

SUMMARY OF THE INVENTION

Accordingly, the present invention has been made to solve the above-mentioned problems occurring in the prior art, and an object of the present invention is to provide a mobile terminal and method for enabling a user to directly input a keyword for a telephone number in an idle state, without the need to select a separate menu for a telephone number search, searching for and displaying telephone numbers corresponding to an inputted component of a keyword (e.g., an alphanumeric character) when a component of the keyword is inputted, and displaying a menu of functions available using a detected telephone number.

In order to accomplish the above object of the present invention, there is provided a method for searching for a telephone number and performing a function using the detected telephone number on a mobile terminal, which includes a first step of checking whether an input by a user in a standby mode is a number of consecutive alphanumeric characters, searching a telephone number database (DB) in the mobile terminal to detect and display telephone numbers having the inputted number of consecutive numeric characters, searching the telephone number DB when the input by the user is an alphabetical character or characters to detect and display telephone numbers of people having names corresponding to the inputted character or characters, and displaying a menu of functions available using any of the displayed telephone numbers.

BRIEF DESCRIPTION OF THE DRAWINGS

The above and other objects, features and advantages of the present invention will be more apparent from the following detailed description taken in conjunction with the accompanying drawings, in which:

FIGS. 6A-6E are screen shots illustrating the display of detected telephone numbers according to the second embodiment of the present invention;

DETAILED DESCRIPTION OF THE PREFERRED EMBODIMENT

Figure 1:
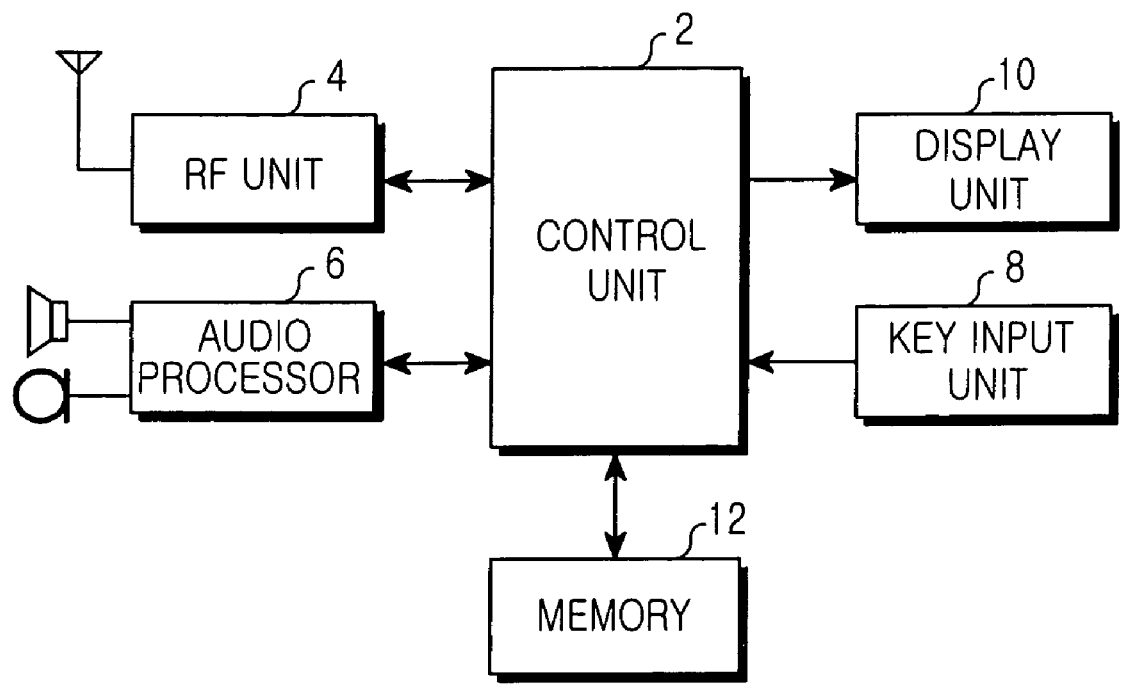
FIG. 1 is a block diagram of a mobile terminal according to an embodiment of the present invention.

Hereinafter, preferred embodiments of the present invention will be described with reference to the accompanying drawings. In the drawings, the same element, although depicted in different drawings, will be designated by the same reference numeral or character. In addition, in the following description of the present invention, a detailed description of known functions and configurations incorporated herein will be omitted when it may make the subject matter of the present invention unclear. FIG. 1 is a block diagram of a mobile terminal according to an embodiment of the present invention. The mobile terminal includes a control section 2, an RF section 4, an audio processor 6, a memory 12, a key input section 8 and a display section 10. The control section 2 controls overall operations of the mobile terminal. According to the present invention, the control section 2 searches for telephone numbers and displays the detected telephone numbers in a standby mode (i.e., an idle state). The control section 2 also displays a menu of functions that can be implemented directly using a displayed telephone number.

The RF section 4 converts audio or control data into wireless signals and transmit the signals. When receiving wireless signals, the RF section 4 converts the signals into audio or control data and outputs the data. The audio processor 6 converts audio data received from the RF section 4 into an audible sound and outputs it through a speaker. The audio processor 6 also modulates an audio signal received from a microphone and converts the signal into speech data and outputs the data.

The key input section 8 is provided with a plurality of number/character keys for inputting numbers and characters. When the user inputs a keyword for a telephone number, the key input section 8 sends a keyword input signal to the control section 2.

The display section 10 displays telephone numbers detected according to the present invention and a menu of functions that can be implemented using any of the displayed telephone numbers. The display section 10 can include an LCD (Liquid Crystal Display).

The memory 12 can include a ROM (Read Only Memory) and a RAM (Random Access Memory) for storing a plurality of programs and data. The memory 12 further includes a telephone number DB according to the present invention. The telephone number DB can store telephone numbers together with the names, photos and icon email addresses of people having the telephone numbers.

Figure 2:
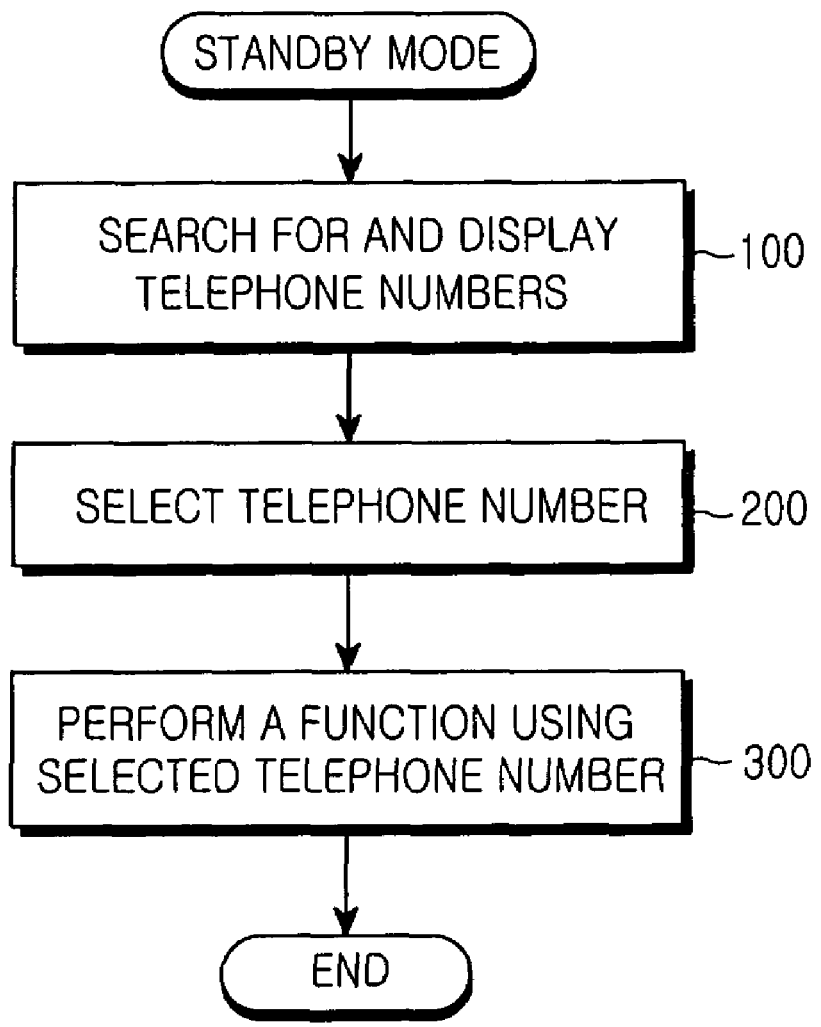
FIG. 2 is a flow chart illustrating a process of searching for a telephone number and performing a function using the detected telephone number according to an embodiment of the present invention.

FIG. 2 is a flow chart illustrating a process of searching for a telephone number and performing a function using the detected telephone number according to an embodiment of the present invention. The process of performing a function using a detected telephone number will be explained in detail with reference to FIG. 2.

At step 100, the mobile terminal searches for telephone numbers corresponding to a keyword entered by the user and displays the detected telephone numbers. To be specific, when the user inputs a keyword in a standby mode, the mobile terminal searches for a telephone number or numbers corresponding to the entered keyword and displays the detected telephone number or numbers.

Step 100 can be a telephone number search according to the first embodiment when the inputted keyword is a number of consecutive digits, or a telephone number search according to the second embodiment when the inputted keyword includes letters or characters, such as English characters.

The telephone number search according to the first embodiment will be explained in detail.

Figure 3:
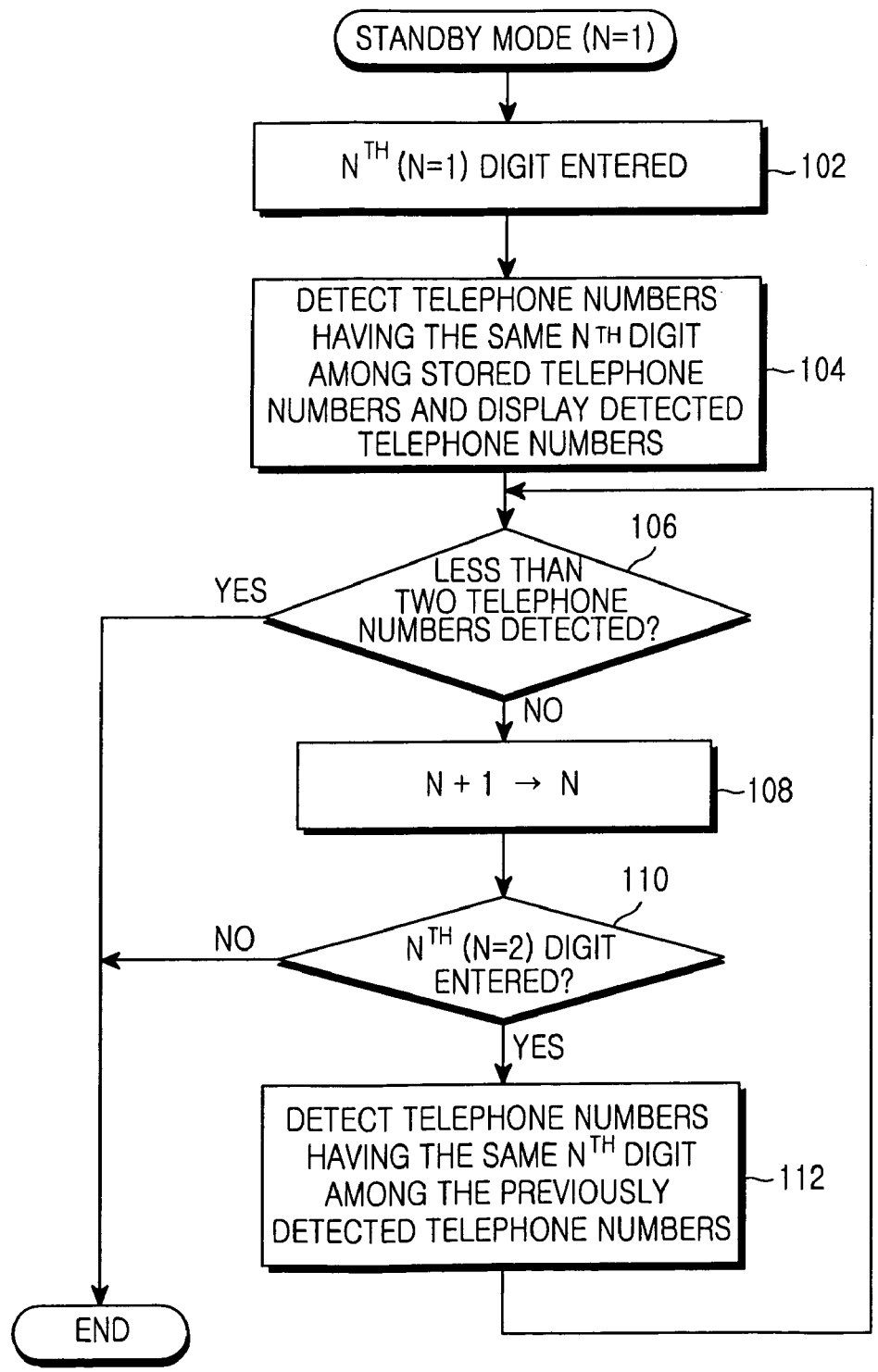
FIG. 3 is a flow chart illustrating a process of searching for telephone numbers according to a first embodiment of the present invention.

FIG. 3 is a flow chart illustrating a process of searching for telephone numbers according to the first embodiment of the present invention and FIGS. 4A-4D are screen shots illustrating the display of detected telephone numbers according to the first embodiment of the present invention.

Figure 4A:
FIGS. 4A-4D are screen slots illustrating the display of detected telephone numbers according to the first embodiment of the present invention.

Referring to FIGS. 3 and 4A-4D, the mobile terminal initializes a variable N representing the order of digits inputted by the user to be one (N=1) in a standby mode (idle state) and displays a standby mode picture as shown in FIG. 4A. At step 102, the mobile terminal displays a first ($N^{th}$, N=1) digit entered by the user.

Figure 4B:
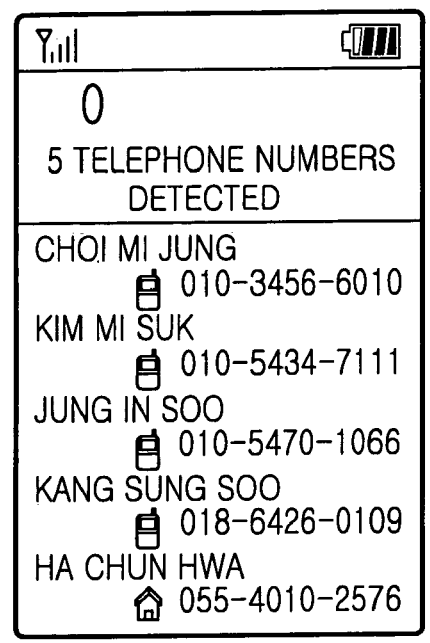

At step 104, the mobile terminal searches the memory 12 to detect telephone numbers beginning with the same digit as inputted by the user. For example, when the user inputs zero "0" as the first digit as shown in FIG. 4B, the mobile terminal searches telephone numbers stored in the memory 12 to detect those beginning with "0." FIG. 4B shows the display of five telephone numbers having "0" as the first digit.

After displaying the detected telephone numbers, the mobile terminal determines whether less than two telephone numbers have been detected at step 106. If so, the mobile terminal will terminate the telephone number searching process. Alternatively, if at least two telephone numbers have been detected as shown in FIG. 4B, the mobile terminal increases the variable N by one (N=2) to enable the user to enter a second digit.

Figure 4C:

At step 110, the mobile terminal determines whether the user has entered a second digit ($N^{th}$, N=2). If no other digits are entered, the mobile terminal terminates the telephone number searching process. But, if another (e.g., a second) digit has been entered, the mobile terminal will proceed with step 112 to detect telephone numbers having the same second digit among the telephone numbers detected at step 104. For example, when the user inputs "1" as the second digit, telephone numbers having "1" as the second digit are detected from those in FIG. 4B and displayed as shown in FIG. 4C. FIG. 4C shows the display of four telephone numbers having "01" as the first and second digits.

Figure 4D:
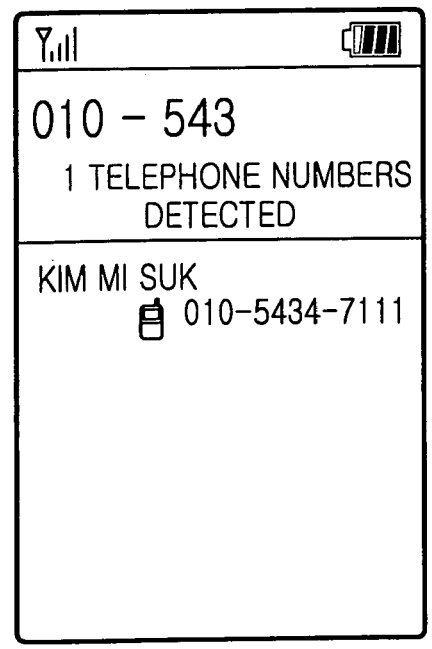

After displaying the detected telephone numbers, the mobile terminals repeats steps 106 through 112. By repeatedly performing steps 106 through 112, it is possible to detect a desired telephone number. When the desired telephone number is finally detected as shown in FIG. 4D, the mobile terminal displays the telephone number and then terminates the telephone number searching process. If the desired telephone number cannot be detected because it is not stored in the memory 12, the mobile terminal will display the digits as inputted by the users and will terminate the searching process.

The telephone number search according to the second embodiment when the entered keyword is a name will be explained in detail.

Figure 5:
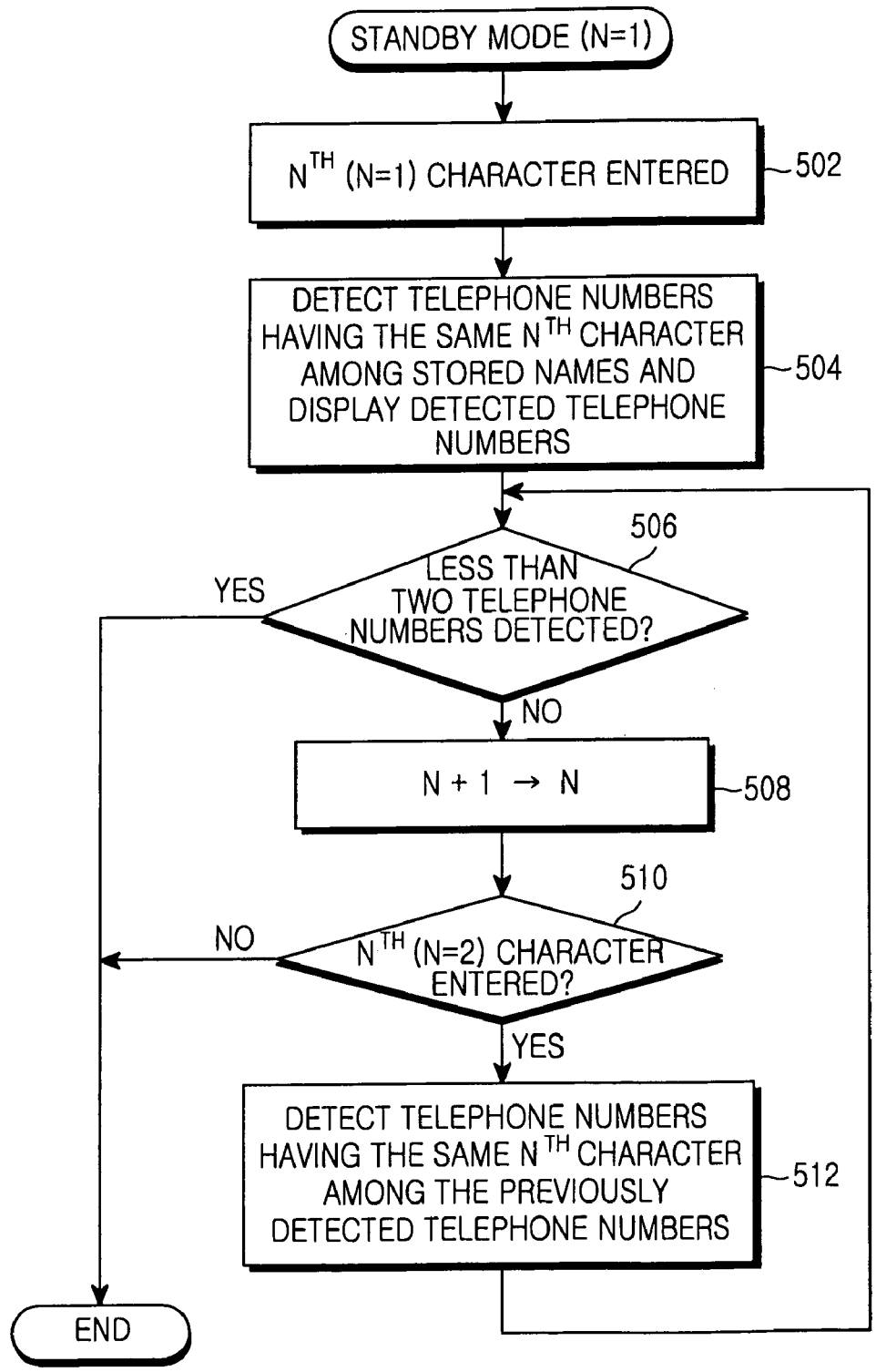
FIG. 5 is a flow chart illustrating a process of searching for telephone numbers according to a second embodiment of the present invention.

FIG. 5 is a flow chart illustrating a process of searching for telephone numbers according to the second embodiment of the present invention. FIG. 6 is a view showing the display of detected telephone numbers according to the second embodiment.

Referring to FIGS. 5 and 6, the mobile terminal initializes a variable N representing the order of characters entered by the user to be one (N=1) in a standby mode (idle state) and displays a standby mode picture as shown in FIG. 6A. At step 502, the mobile terminal displays a first character entered by the user. At step 504, the mobile terminal searches the memory 12 to detect names of people beginning with the same ($N^{th}$, N=1) character as inputted by the user and displays telephone numbers (A as shown in FIG. 6B) corresponding to the detected names of people. For example, when the user inputs an "L" as the first character as shown in FIG. 6B, the mobile terminal searches names of people beginning with the same character (i.e.,"L" in this example which may or may not be case sensitive)and displays telephone numbers A corresponding to the names. FIG. 6B shows the display of three names beginning with the character "L" and corresponding telephone numbers A (e.g., Lee Mun Sun 019-123-2468, Lee Myung Hwan 019-123-9876, Lee Doo Seok 019-123-4567). After displaying the detected names and telephone numbers, the mobile terminal determines whether less than two telephone numbers A has been detected at step 506. If so, the mobile terminal will terminate the telephone number searching process. If at least two telephone numbers A have been detected, the mobile terminal will increase the variable N by one (N=2) at step 508 and will determine whether the user has entered a second character ($N^{th}$(N=2) character) at step 510.

If no further (second) character is entered, the mobile terminal will terminate the telephone number searching process.

If a second character is entered, the mobile terminal detects names of people having a second character which is the same as the second character inputted by the user and displays corresponding to the detected names of people among the previously detected telephone numbers B. As stated above, while steps 506 to 512 are repeated, if a fourth character ($N^{th}$(N=4) character) is entered, the mobile terminal will proceed with step 512 to detect names having the same fourth character from the previously detected names (i.e., those having the same first to third characters as inputted by the user) and telephone numbers A and display the newly detected names and corresponding telephone numbers B.

For example, when the user inputs "M" as the fourth character, the mobile terminal detects names having "M" as the fourth character and their corresponding telephone numbers B from the previously detected names and telephone numbers A in FIG. 6B and displays the detected names and telephone numbers B. FIG. 6C shows the display of two names having "M" as the fourth character and telephone numbers B (Lee Mun Sun 019-123-9876, Lee Myung Hwan 019-123-9876). If "y" is inputted as a subsequent character, only the name including the first to fifth characters "L e e M y" will be displayed. In other words, "Lee Myung Hwan 019-123-9876" will be displayed as the results of search. After displaying the detected names and telephone numbers B, the mobile terminal proceeds with step 506 to determine whether less than two telephone numbers B have been detected. If so, the mobile terminal will terminate the telephone number searching process. If at least two telephone numbers B have been detected, the mobile terminal will increase the variable N by one (N=5) at step 508 and will determine whether the user has inputted a fifth character (Nth (N=5) character) at step 510.

If no further (fifth) character is inputted, the mobile terminal will terminate the telephone number searching process.

If a fifth character is inputted, the mobile terminal will proceed with step 512 to detect names having the same fifth character and corresponding telephone numbers C (shown in FIG. 6D) from the previously detected names and telephone numbers B and display the newly detected names and telephone numbers C.

Figure 6D:
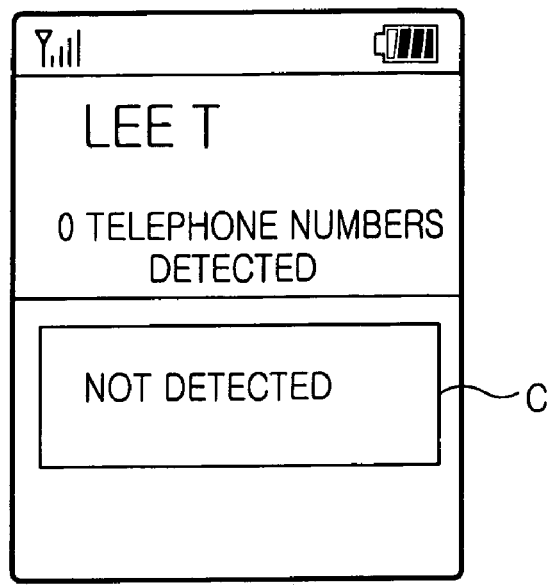
Figure 6E:
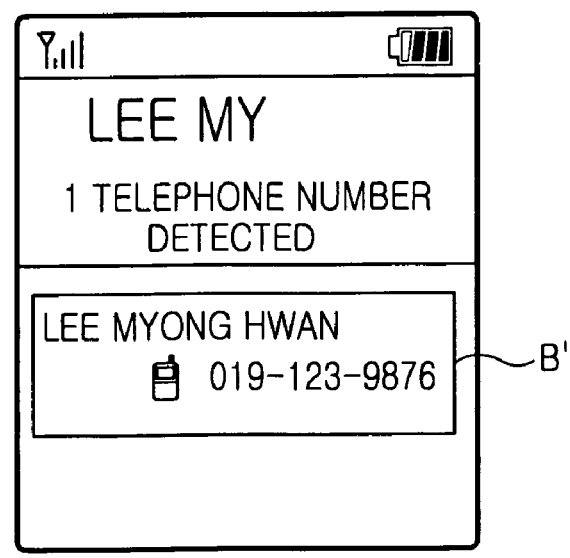
Figure 7A:
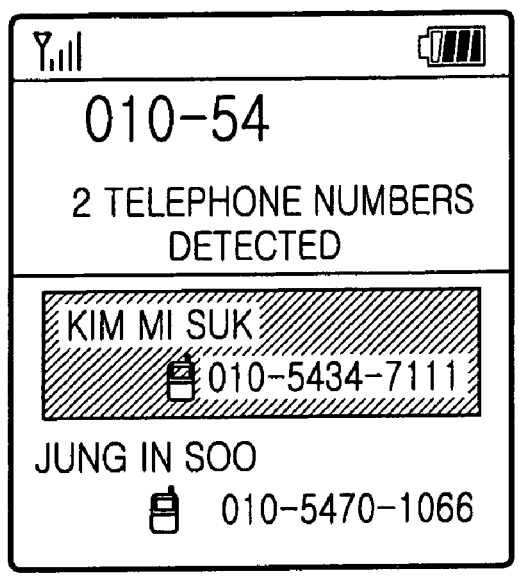
FIGS. 7A and 7B are screen shots illustrating the select on of one of the displayed telephone numbers according to an embodiment of the present invention.
Figure 7B:
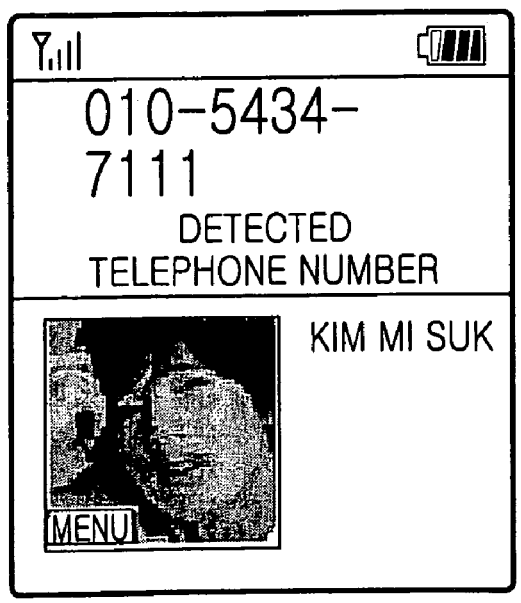

The mobile terminals detects names and corresponding telephone numbers stored in the telephone number DB by repeatedly performing steps 506 through 512. When the telephone number of a person is finally detected as shown in FIG. 6E through the name searches as explained above, the mobile terminal displays the telephone number B' and then terminates the telephone number searching process. If the desired telephone number cannot be detected because it is not stored in the memory 12, the mobile terminal will display "Not Detected" as shown in FIG. 6D and will terminate the searching process.

Referring back to FIG. 2, at step 200, the mobile terminal enables the user to select one of the telephone numbers detected at step 100. If a telephone number was not detected at step 100, the mobile terminal terminates the related procedure. When only one telephone number was detected, the mobile terminal recognizes the detected telephone number as having been selected by the user. When two or more telephone numbers were detected, the mobile terminal enables the user to select one of the detected telephone numbers.

At step 300, upon the user's key input to perform a particular function, the mobile terminal performs the function using the selected telephone number.

The particular function can be a phone call to the selected telephone number, a text messaging to the selected telephone number, a color mail to the selected telephone number or editing of telephone numbers.

Figure 8:
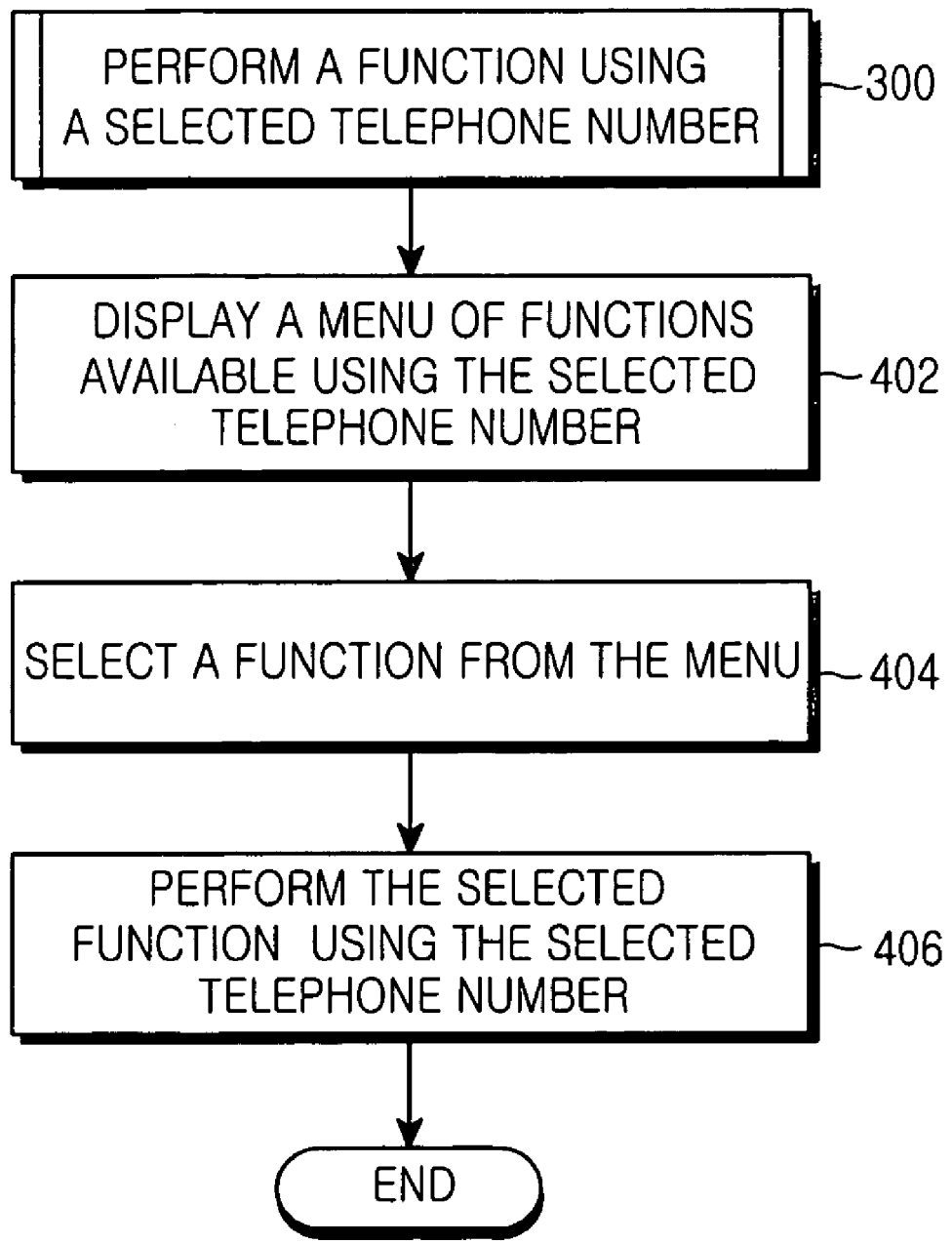
FIG. 8 is a flow chart illustrating a process of performing a function using a selected telephone number according to an embodiment of the present invention.
Figure 9:
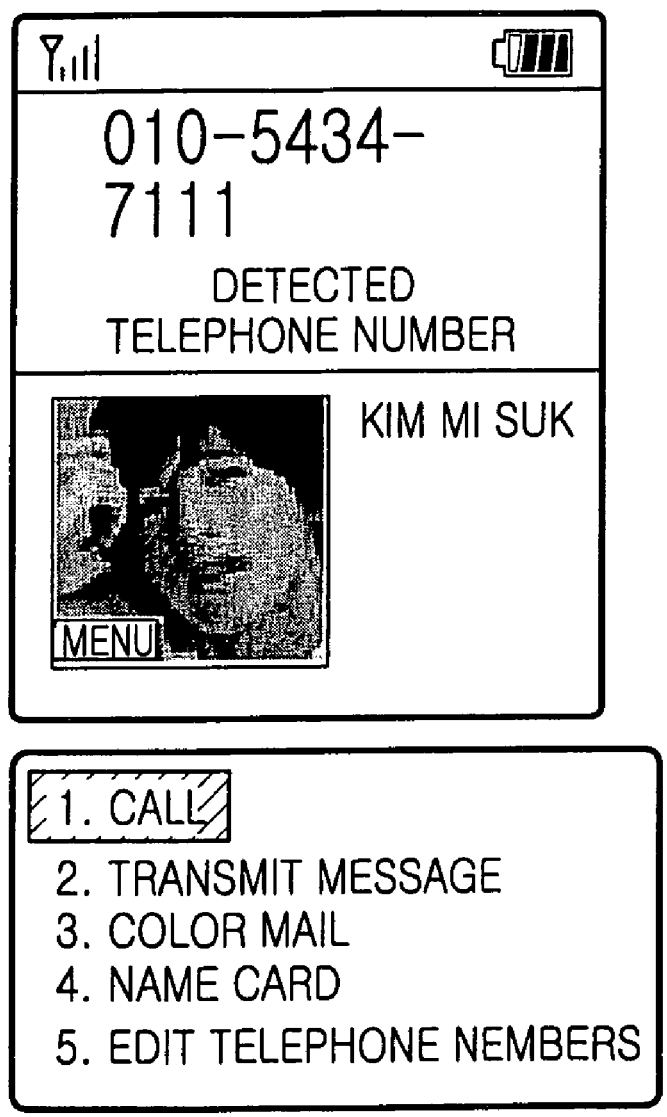
FIG. 9 are screen shots illustrating the display of a selected telephone number and a menu of functions available using the selected telephone number according to an embodiment of the present invention.

Hereinafter, a process of performing a function using a selected telephone number will be explained in detail. FIG. 8 is a flow chart illustrating a process of performing a function using a selected telephone number according to an embodiment of the present invention. FIG. 9 are screen shots illustrating the display of a selected telephone number and available functions using the telephone number according to an embodiment of the present invention.

Referring to FIGS. 8 and 9, the mobile terminal displays information associated with a selected telephone number, together with a menu of functions available using the telephone number. The functions may include call, text message, color mail, vCard and telephone number addition as shown in FIG. 9.

After displaying the menu of functions as shown in FIG. 9, the mobile terminal accesses a function as selected by the user from the displayed menu at step 404. For example, when the user selects the "call" function, the mobile terminal accesses the call function. When the user selects the "text message" function, the mobile terminal accesses the text message function.

At step 406, the mobile terminal performs the selected (or highlighted) function. For example, if the user has selected the call function, the mobile terminal will perform the function to make a call to the selected telephone number. If the user has selected the text message function, the mobile terminal will perform the function to send a text message to the selected telephone number.

As explained above, the mobile terminal according to the present invention enables the user to input a keyword for a telephone number in an idle state, without the need to select a separate menu for telephone number search. Whenever each consecutive component of the keyword is inputted, the mobile terminal immediately searches for telephone numbers corresponding to the inputted component and displays the detected telephone numbers, thereby enabling the user to detect a desired telephone number within a few steps. Also, the mobile terminal displays a menu of functions available using a selected telephone number so that the user can directly select and use a function, thereby enhancing user convenience.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for searching for a telephone number and performing a function using the detected telephone number on a mobile terminal, the method comprising:
   a) determining whether an entry by a user in a standby mode is one or more alphanumeric characters;
   b) searching a telephone number database (DB) in real time, every time each of the one or more alphanumeric characters is entered, for at least one telephone number comprising at least one of the one or more alphanumeric characters being fully entered in the standby mode, when the one or more alphanumeric characters comprise one or more numeric characters;
   c) searching the telephone number DB in real time, every time each of the one or more alphanumeric characters is entered, for at least one telephone number having names comprising at least one of the one or more alphanumeric characters being fully entered in the standby mode, when the one or more alphanumeric characters comprise one or more alphabetical characters; and
   d) displaying a menu of functions available using a displayed telephone number.

2. The method as claimed in claim 1, wherein said functions comprise a call function.

3. The method as claimed in claim 1, wherein said functions available comprise a text message function.

4. The method as claimed in claim 1, wherein said functions available comprise a multimedia message function for sending mail with at least one of an image or a photo attached.

5. The method as claimed in claim 1, wherein said functions available comprise a function to edit telephone numbers.

6. The method as claimed in claim 1, wherein step b) comprises:
   searching the telephone number DB to detect at least one telephone number having the same digit and displaying detected telephone numbers, when a first digit is entered by the user;
   receiving a second digit which is entered by the user, detecting telephone numbers having the same second digit from the previously detected telephone numbers and displaying the newly detected telephone numbers when two or more telephone numbers are detected; and
   repeating the receiving, detecting and displaying step.

7. The method as claimed in claim 1, wherein step c) comprises:
   searching the telephone number DB to detect names according to a first entry by the user and displaying the detected mimes and their corresponding telephone numbers, when said entry by the user is a character; and
   detecting names according to a second entry from the previously detected names and displaying the newly detected names and their corresponding telephone numbers.

8. The method as claimed in claim 1, wherein step d) comprises:
   displaying a telephone number selected by the user from the detected telephone numbers;
   displaying a menu of one or more functions that can be implemented using the selected telephone number; and
   performing a function selected by the user to the selected telephone number.

9. The method as claimed in claim 1, wherein step b) comprises searching for a telephone number in which same digits as input digits are arranged in the input order of the input digits when numeric characters are input in the standby mode, and wherein step c) comprises searching for a telephone number having a name in which same characters as at least one input character are arranged in the input order of the at least one input character when character is input in the standby mode.

10. A mobile terminal adapted for searching for a telephone number and performing a function using the detected telephone number, wherein the mobile terminal comprises:
   a) checking means for checking whether an entry by a user in a standby mode is one or more alphanumeric characters;
   b) searching means for searching a telephone number database in real time, every time each of the one or more alphanumeric characters is entered, for at least one telephone number comprising at least one of the one or more alphanumeric characters being fully entered in the standby mode, when the one or more alphanumeric characters comprise one or more numeric characters, and for searching a telephone number database in real time, every time each of the one or more alphanumeric characters is entered, for at least one telephone number having names comprising at least one of the one or more alphanumeric characters being fully entered in the standby mode, when the one or more alphanumeric characters comprise one or more alphabetical characters; and
   c) displaying means for displaying a menu of functions available using a displayed telephone number.

* * * * *